Figure 1:
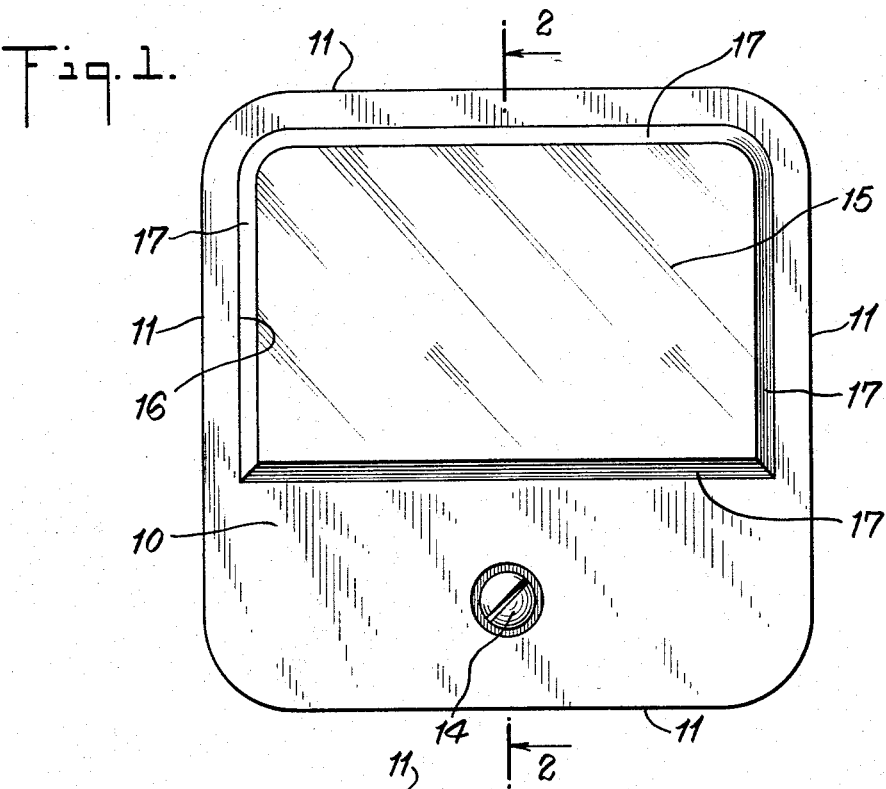

Oct. 18, 1966     TAKEO KURAMOTO     3,279,646
METER COVERS
Filed Jan. 31, 1962

INVENTOR.
TAKEO KURAMOTO
BY
Benj. T. Rauber
ATTORNEY

United States Patent Office 3,279,646
Patented Oct. 18, 1966

3,279,646
METER COVERS
Takeo Kuramoto, % Kyoritsu Electrical Instruments
Works, Ltd., Tokyo, Japan
Filed Jan. 31, 1962, Ser. No. 170,104
1 Claim. (Cl. 220—82)

My present invention relates to meter covers, more particularly to covers for electric meters. The meters may be of any desired shape and size but the invention is more particularly concerned with small meters such as are used for communications systems.

Meters have heretofore been made of metal or plastics and were provided with a glass window or windows through which the meter dial and indicator could be observed. The glass window was secured over an opening by cementing it at its edges to the margin of the cover about the opening or securing it thereto by clamps, bolts, screws or equivalent means. In some cases the glass was secured by both cementing and mechanical securing means. These former constructions required manual labor and skill in their construction and assembly which added to their cost. Recently covers have been made of plastic materials with transparent area instead of glass for windows. While this tended to reduce the cost somewhat it had the disadvantages that the clear plastic forming the window, being softer than glass, was liable to surface deterioration from wear, abrasion and surface scratching which reduced its transparency. Moreover, the plastic was subject to excessive static charges in regions where the humidity is low.

My present invention provides a molded plastic meter cover having a glass window mounted hermetically therein without the use of adhesives or mechanical securing means, and also provides a method whereby the glass may be mounted in the meter cover with a minimum of labor and expense. The meter cover of my invention also provides a maximum clear area for the window due to the elimination of adhesives and mechanical securing means.

In my invention the glass is provided with a beveled edge and the plastic material of the cover supporting the window is molded to and embeds this beveled edge in the formation or molding of the cover. The plastic composition of which the cover is made may be of any suitable type, such as a thermoplastic composition which may readily be shaped in a mold. Preferably the plastic is of the impact type having a degree of pliability but of a rigidity when molded to hold its shape and retain the window glass securely. It may be a clear colorless resin such as a methyl methacrylate resin or a polystyrene resin or it may be tinted or opaque.

In forming the cover, the glass is put in place in a mold and the plastic which is to form the cover is molded to the shape of the cover and to embed the beveled edge of the glass. The plastic does not cover or coat the glass but forms a firm, substantially hermetic, joint or seal with the beveled edge. The edge of the glass plate may be beveled in any suitable manner so that the plastic may unite with it.

Figure 2:
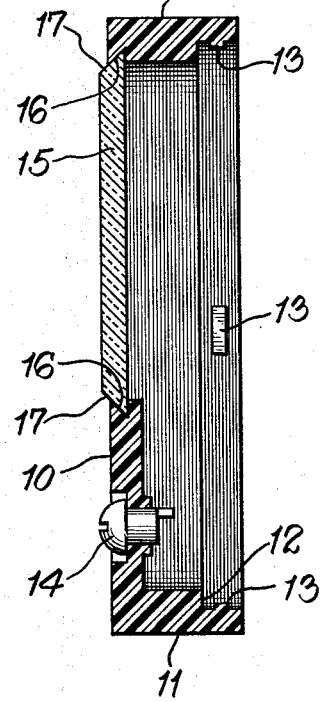

An embodiment of the invention is illustrated by way of example in the accompanying drawings, in which:

FIG. 1 is a front view of a cover for a meter such as may be used in electric communications systems or apparatus and, FIG. 2 is a section of the cover taken on line 2—2 of FIG. 1.

Referring to the drawings, the cover illustrated therein comprises a front wall 10 and four side walls 11 molded integrally with the front wall and having a recess 12 at the inner face of the free edge into which the base of the meter casing, not shown, is received. Small projections 13 are provided in the recess for attaching the base. An adjusting device 14 may be provided in the front wall 10 of the cover.

In the front wall 10 a plate 15 of glass is molded to span and cover an opening 16. The edges of the plate 15 are beveled as shown at 17 and the plastic is molded to embed the beveled edge. As shown in the drawings, the beveled edge is embedded in the upper and side parts of the cover the edges being sloped from the front surface of the glass outwardly toward the rear face thereof. As shown the beveled part of the glass may extend forwardly of the face of the front wall to give the cover a pleasing and attractive appearance. As there is no cemented margin about the glass nor fixtures or frames for attachment of the glass, a maximum of window area is obtained.

In forming the cover, the glass plate is placed in a mold and the plastic molded to form the side walls and the portions of the front wall about the window. The molded plastic having been forced against the beveled edges by the molding pressure forms a firm and dust and moisture-proof seal about the glass. The molding of the plastic to form the cover and to seal the glass plate may be made in one operation and with a minimum of cost. All of the advantages of a glass window are obtained with the economy of a molded plastic.

In the example shown the cover is of rectangular shape but it will be understood that covers of other shapes may be formed according to my invention, such as, circular, elliptical or other shapes. Shapes of windows may easily be made where it would be extremely difficult to mount windows of glass by the methods heretofore known.

Having described my invention, I claim:
A meter cover having
 (a) a front wall and side walls at the edges of said front wall,
  (a1) said front wall and side walls being integrally formed of a rigid organic thermoplastic, and
  (a2) said front wall having a rectangular window opening, and
 (b) a flat transparent glass plate closing said window opening and having beveled edges,
  (b1) said side walls and said front wall being molded directly to said beveled edges of said opening to form a dust-proof cover for a meter container,
  (b2) said glass plate having surfaces in substantially parallel flat planes and with its peripheral edges beveled from the front surface at an acute angle to the rear surface,
  (b3) said front wall comprising a flat plate of thermoplastic material molded to said beveled edges with the outer surface of said thermoplastic plate joining said beveled edges of said glass plate rearwardly from the front surface of said glass plate and the inner surface of said thermoplastic plate inwardly of the inner surface of said glass plate, (c) said front surface of said glass plate being on a plane spaced outwardly from the plane of the front surface of said thermoplastic plate in stepped relation and the rear surface of the glass plate being on a plane spaced outwardly of the plane of the rear surface of the thermoplastic plate, (d) whereby a portion only of said beveled edges of said glass plate is molded to said front wall.

References Cited by the Examiner

UNITED STATES PATENTS

| | | | |
|---|---|---|---|
| 712,514 | 11/1902 | Erickson | 220—27 |
| 2,304,984 | 12/1942 | Wood. | |
| 2,506,003 | 5/1950 | Triplett | 220—82 |
| 2,554,058 | 5/1951 | Phipps | 189—78 |
| 2,581,734 | 1/1952 | Triplett | 220—82 |
| 2,647,404 | 8/1953 | Whitworth | 220—82 |

LOUIS G. MANCENE, *Primary Examiner.*

EARL J. DRUMMOND, THERON E. CONDON, GEORGE O. RALSTON, *Examiners.*